(12) United States Patent
Pebley et al.

(10) Patent No.: US 8,788,178 B2
(45) Date of Patent: Jul. 22, 2014

(54) ENGINE AUTO STOP AND AUTO START STRATEGIES

(75) Inventors: Kirk Pebley, Novi, MI (US); Sangeetha Sangameswaran, Canton, MI (US); William James Bouse, Ann Arbor, MI (US); Chester Gordon Hearn, Westland, MI (US); John Michael Jakupco, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 613 days.

(21) Appl. No.: 13/165,830

(22) Filed: Jun. 22, 2011

(65) Prior Publication Data

US 2012/0330529 A1      Dec. 27, 2012

(51) Int. Cl.
*G06G 7/70* (2006.01)
*F02N 11/08* (2006.01)
*B60W 10/04* (2006.01)
*B60W 10/20* (2006.01)

(52) U.S. Cl.
CPC ....... *F02N 11/084* (2013.01); *F02N 2200/0808* (2013.01); *F02N 11/0844* (2013.01)

USPC .............................................. 701/101; 701/41

(58) Field of Classification Search
CPC .............. F02N 11/084; F02N 11/0844; F02N 2200/0808
USPC ............................ 701/101, 102, 41, 112, 113
See application file for complete search history.

(56) References Cited

U.S. PATENT DOCUMENTS

| | | | |
|---|---|---|---|
| 6,334,834 B1 | 1/2002 | Mizutani et al. | |
| 6,675,094 B2 | 1/2004 | Russell et al. | |
| 8,019,506 B2 * | 9/2011 | Markiton et al. | 701/41 |
| 8,392,066 B2 * | 3/2013 | Ehara et al. | 701/41 |
| 2009/0171547 A1 | 7/2009 | Hyde et al. | |
| 2010/0125402 A1 | 5/2010 | Bansal et al. | |
| 2010/0286868 A1 | 11/2010 | Ehara et al. | |

* cited by examiner

*Primary Examiner* — Hieu T Vo

(74) *Attorney, Agent, or Firm* — David B. Kelley; Brooks Kushman P.C.

(57) ABSTRACT

An automotive vehicle includes an engine and at least one controller. The at least one controller receives information about steering angle velocity or steering input torque during an engine auto stop event, and determines whether to allow the engine to auto stop based on the received information.

15 Claims, 3 Drawing Sheets

US 8,788,178 B2

ENGINE AUTO STOP AND AUTO START STRATEGIES

TECHNICAL FIELD

This disclosure relates to strategies for determining when to inhibit an engine auto stop and when to initiate an engine auto start.

BACKGROUND

A micro hybrid vehicle may automatically stop its internal combustion engine after coming to a stop. Such a vehicle may also restart its engine before accelerating from the stop. These engine auto stops and auto starts may improve fuel economy by reducing engine idle time (and thus fuel consumption) for a given drive cycle.

An engine of a micro hybrid vehicle may be arranged to drive an alternator, which provides electric power for certain electric power consuming systems and devices within the vehicle (e.g., electric power steering assist). Hence, these systems and devices may not be operable during an engine auto stop.

SUMMARY

An automotive vehicle may include an engine and at least one controller. The at least one controller may receive information about steering angle velocity or steering input torque during an engine auto stop event, detect an engine auto stop inhibit condition when one of the steering angle velocity or steering input torque exceeds a threshold value, and inhibit an auto stop of the engine in response to detecting the engine auto stop inhibit condition.

The controller may further receive information about whether the engine is stopped, detect an engine auto start condition when the engine is stopped and one of the steering angle velocity or steering input torque exceeds a threshold value, and initiate an auto start of the engine in response to detecting the engine auto start condition.

Inhibiting an auto stop of the engine may include commanding fuel to resume flowing to the engine.

Inhibiting an auto stop of the engine may include preventing the engine from stopping.

Initiating an auto start of the engine may include commanding a starter to crank the engine.

A method for controlling an automotive vehicle engine may include receiving information about steering angle velocity or steering input torque during an engine auto stop event, detecting an engine auto stop inhibit condition when one of the steering angle velocity or steering input torque exceeds a threshold value, and inhibiting an auto stop of the engine in response to detecting the engine auto stop inhibit condition.

Inhibiting an auto stop of the engine may include commanding fuel to resume flowing to the engine.

Inhibiting an auto stop of the engine may include preventing the engine from stopping.

The method may further include receiving information about whether the engine is stopped, detecting an engine auto start condition when the engine is stopped and one of the steering angle velocity or steering input torque exceeds a threshold value, and initiating an auto start of the engine in response to detecting the engine auto start condition.

Initiating an auto start of the engine may include commanding a starter to crank the engine.

A micro hybrid vehicle may include an engine and at least one controller configured to determine whether to allow the engine to auto stop based on information about steering input torque or rate of change of steering angle.

Determining whether to allow the engine to auto stop may include determining whether the steering input torque or rate of change of steering angle exceeds a threshold value.

The at least one controller may further determine whether to command the engine to auto start based on the information about steering input torque or rate of change of steering angle.

The at least one controller may further command the engine to auto start if the steering input torque or rate of change of steering angle exceeds a threshold value.

Commanding the engine to auto start may include commanding a starter to crank the engine.

DETAILED DESCRIPTION

Figure 1:
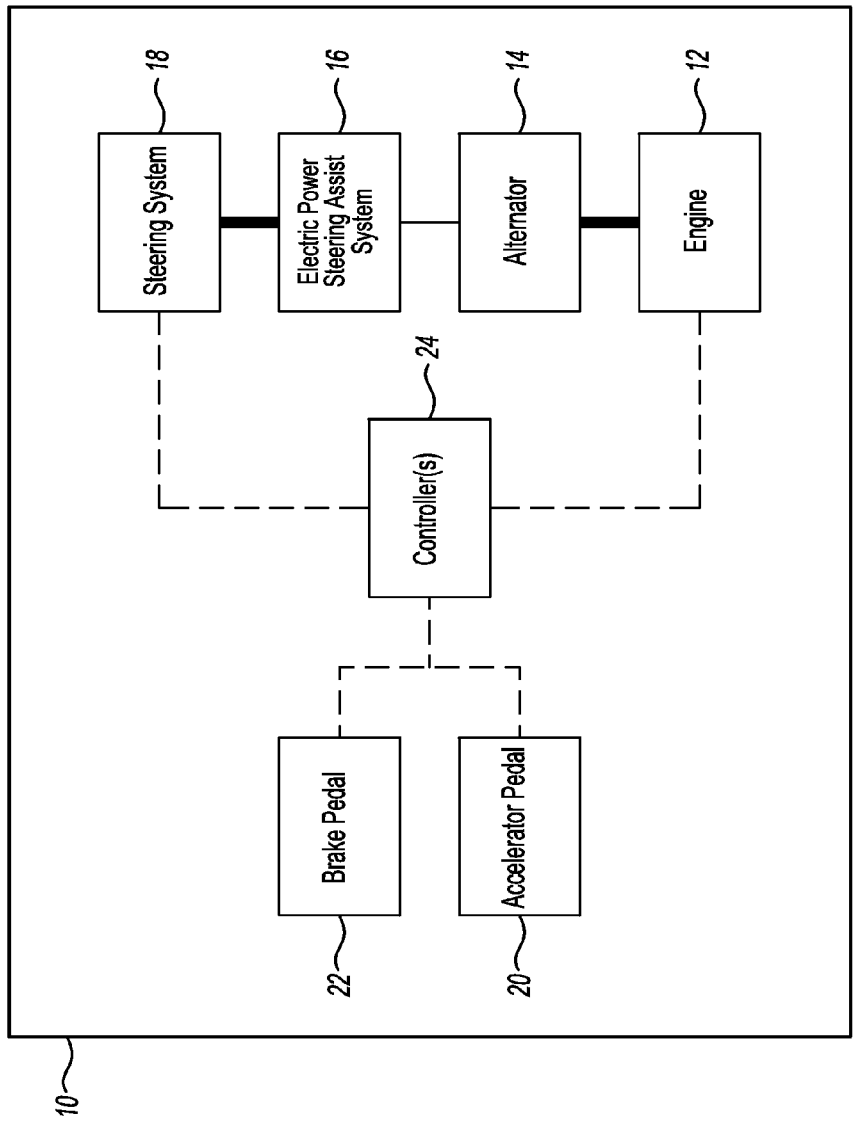
FIG. 1 is a block diagram of a micro hybrid vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Micro hybrid vehicles with enhanced starter motor technology may have a power supply with limited capability in terms of the current available to provide power for electric power steering (EPS) assist during an auto stop event. Therefore, to avoid undesirable events such as substantial drops in system voltage, EPS assist may not be provided once the engine has shut down until the engine restarts again. This condition, however, may create satisfaction issues for a driver that, for example, wants to turn the steering wheel during or immediately following an auto stop event. Such turning may require additional steering effort.

Certain micro hybrid vehicles appear to use steering angle (steering wheel angle) in determining whether to inhibit engine auto stop and initiate engine auto start. If the steering angle is greater than, for example, 90 degrees relative to center when the vehicle comes to a stop (engine on), engine auto stop may be inhibited (engine remains on). If the steering angle becomes greater than, for example, 90 degrees relative to center during an engine auto stop (engine off), engine auto start may be initiated (engine starts).

Effectively inhibiting engine auto stops and initiating engine auto starts, however, depends on the vehicle's ability to anticipate the likelihood that a driver will require assisted steering capability. Overestimating such required capability will result in inhibited engine auto stops and initiated engine auto starts that are not necessary to support the driver's desire for steering assist. This will increase overall engine idle time for a given drive cycle and hence decrease fuel economy. Underestimating such required capability will result in instances in which the driver will desire steering assist and such assist will not be available, which may cause customer dissatisfaction.

It has been discovered that rate of change of steering angle and steering input torque are better indicators of a driver's desire for steering assist compared with steering angle. The use of these parameters in engine auto stop/engine auto start strategies may reduce unnecessary inhibited engine auto stops and initiated engine auto starts, thus improving fuel economy for a given drive cycle. The use of these parameters may also reduce instances in which desired steering assist is unavailable, thus improving customer satisfaction.

Certain control strategies/algorithms described herein may anticipate the likelihood of a driver desiring steering capability and thus may inhibit engine auto shut down (prevent the engine from stopping). Control strategies/algorithms for inhibiting an engine auto stop may include evaluating, for example, rate of change of steering angle and/or steering input torque. If any of these parameters exceeds a preset value while entering an auto stop event, the auto stop may be inhibited and EPS assist may be maintained allowing the driver (or other steering authority) to quickly turn.

When the vehicle comes to a stop (engine on) and the steering angular velocity (e.g., steering wheel angular velocity) is greater than, for example, 50 degrees per second indicating that a turn is in progress, engine auto stop may be inhibited (engine remains on). This threshold steering angular velocity may be calibrated to meet customer satisfaction requirements. When the vehicle comes to a stop (engine on) and the steering input torque (e.g., steering wheel input torque) is greater than, for example, 2 newton meters indicating that a turn is imminent following the auto stop event, engine auto stop may be inhibited (engine remains on). This threshold steering input torque may be calibrated to meet customer satisfaction requirements.

Likewise, a control strategy for initiating an engine auto start may include evaluating, for example, rate of change of steering angle and/or steering input torque. If any of these parameters exceeds a preset value during an auto stop, an engine auto start may be initiated and EPS assist may be enabled allowing the driver to quickly turn. During an auto stop (engine off), if the steering angular velocity (e.g., steering wheel angular velocity) becomes greater than, for example, 50 degrees per second indicating that a turn is in progress, an engine auto start may be initiated (engine starts). This threshold steering angular velocity may be calibrated to meet customer satisfaction requirements. During an engine auto stop (engine off), if the steering input torque (e.g., steering wheel input torque) becomes greater than, for example, 2 newton meters indicating that a turn is imminent following the auto stop, an engine auto start may be initiated (engine starts). This threshold steering input torque may be calibrated to meet customer satisfaction requirements. The above strategies may ensure sufficient electric power to provide EPS assist so a driver can execute a turn normally without hesitation following an auto stop.

Referring to FIG. 1, a micro hybrid vehicle 10 may include an engine 12, an alternator 14, an electric power steering assist system 16, and a steering system 18 (e.g., steering wheel, etc.) The vehicle 10 may also include an accelerator pedal system 20, a brake pedal system 22, and one or more controllers 24. The engine 12, steering system 18, and pedal systems 22, 24 are in communication with/under the control of the controllers 24 (as indicated by dashed line). The engine 12 is arranged to mechanically drive the alternator 14 (as indicated by heavy line) such that the alternator 14 generates electric current. The alternator 14 is electrically connected with the electric power steering assist system 16 (as indicated by light line), which is configured to reduce steering efforts associated with the steering system 18. As such, the electric power steering assist system 16 may consume current generated by the alternator 14.

The controllers 24 may initiate an auto stop or an auto start of the engine 12. As the driver engages the brake pedal 22 and the vehicle 10 comes to a stop, for example, the controllers 24 may issue a command to begin the process of stopping the engine 12, thus preventing the engine 12 from powering the electric power steering system 16 via the alternator 14. As the driver disengages the brake pedal 22 (and/or engages the accelerator pedal 20) the controllers 24 may issue a command to begin the process to start the engine 12, thus enabling the engine 12 to power the electric power steering assist system 16 via the alternator 14.

The controllers 24 may inhibit an auto stop of the engine 12 based on steering inputs to the vehicle 10. As mentioned above, the controllers 24 may determine (detect, observe, etc.) in any suitable/known fashion the rate of change of steering angle and/or steering input torque associated with, in this embodiment, the steering system 18. If any of these parameters exceeds a calibrated threshold as described above, the controllers 24 may not issue the command to begin the process to stop the engine 12 or, if such a command has been issued, take measures to prevent the engine 12 from stopping.

Likewise, the controllers 24 may initiate an auto start of the engine 12 based on steering inputs to the vehicle 10. As mentioned above, the controllers 24 may determine (detect, observe, etc.) the rate of change of steering angle and/or steering input torque associated with, in this embodiment, the steering system 18. If any of these parameters exceeds a calibrated threshold as described above during an auto stop event, the controllers 24 may issue a command to start the engine 12.

Figure 2:
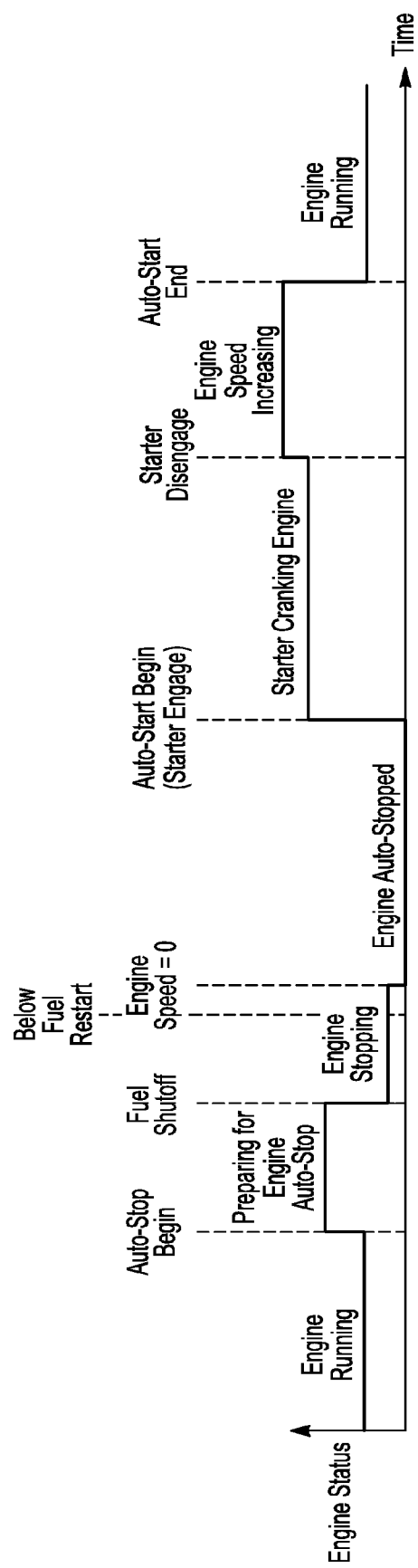
FIG. 2 is a plot illustrating engine status during an engine auto stop event.

Referring to FIG. 2, an engine auto stop event may include several stages: "auto-stop begin," which marks the beginning of the engine auto stop event; "preparing for engine auto-stop," which is the time period during which vehicle systems as well as the engine are prepared for the impending engine stop (if an auto stop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed is reduced to 0; "below fuel restart," which marks the point after which if a restart is requested to inhibit the auto stop during the "engine stopping" stage, the starter may need to be engaged to crank the engine (if a restart is requested before "below fuel restart" and during the "engine stopping" stage, the engine may be restarted to inhibit the auto stop by turning the flow of fuel back on); "engine speed=0," which marks the point at which the engine speed is near or equal to 0; "engine auto-stopped," which is the time period during which the engine is off; "starter engage," which marks the point at which the starter starts to crank the engine in an effort to start the engine (in response to detecting an engine auto start condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed; "auto-start end," which marks the point at which the speed of the engine achieves its running speed (a speed at or above target idle speed).

Figure 3:
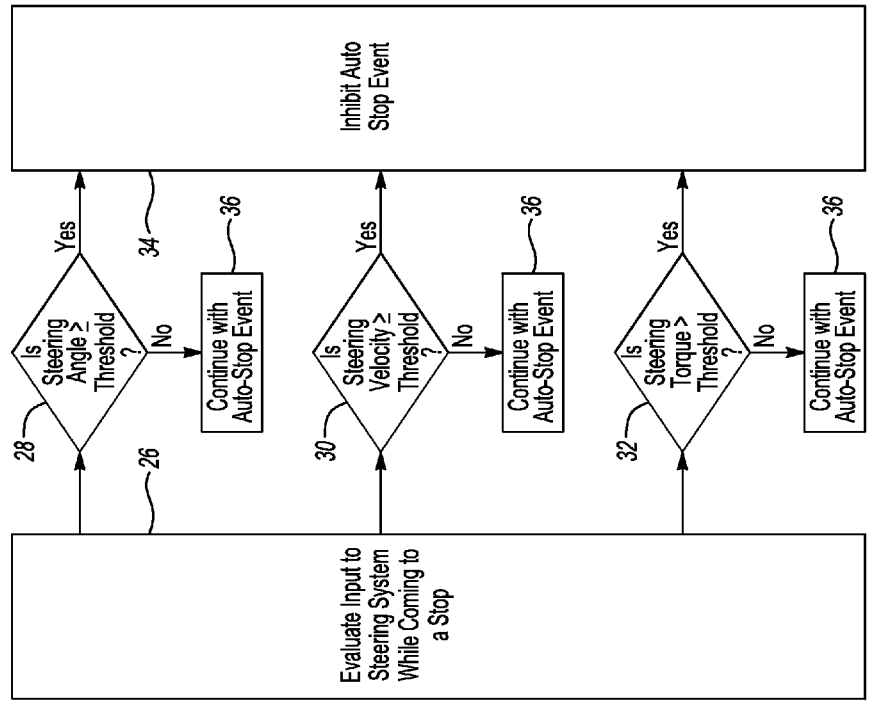
FIG. 3 is a flow chart illustrating an algorithm for inhibiting an engine auto stop.

Referring to FIG. 3, steering inputs to the vehicle (as the vehicle is coming to a stop) may be evaluated at operation 26. At operation 28, it is determined whether the steering angle is greater than a threshold value. At operation 30, it is determined whether the steering angle velocity is greater than a threshold value. At operation 32, it is determined whether the steering torque is greater than a threshold value. If the answer at any of operations 28, 30, 32 is yes, the auto stop command may be inhibited at operation 34. That is, the engine is not allowed to stop. If the answer to all of the operations 28, 30, 32 is no, the auto stop command may not be inhibited at operation 36. That is, the engine is allowed to stop.

Figure 4:
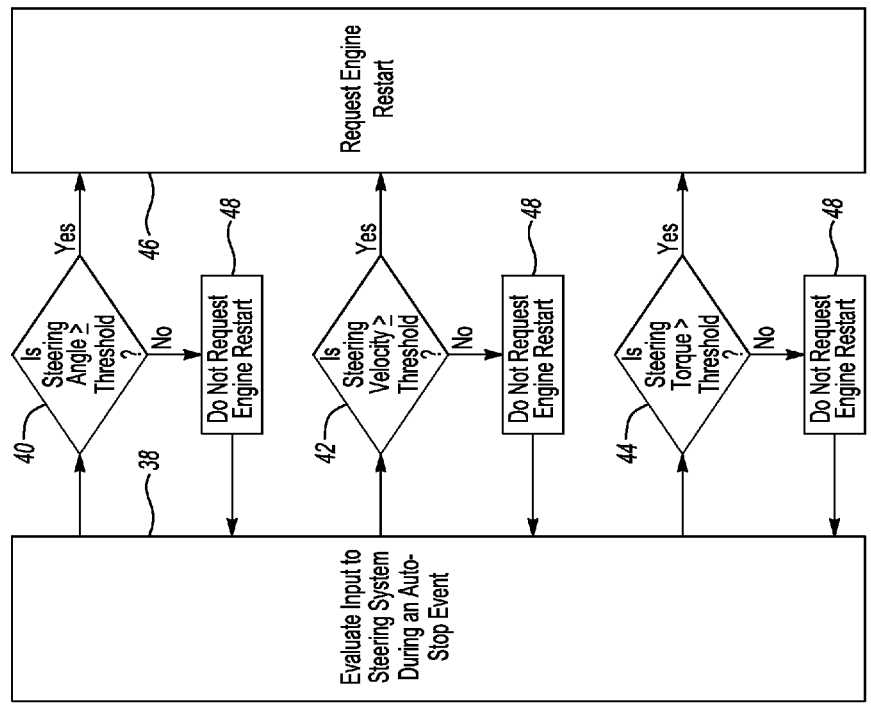
FIG. 4 is a flow chart illustrating an algorithm for initiating an engine auto start.

Referring to FIG. 4, steering inputs to the vehicle may be evaluated during an auto stop event at operation 38. At operation 40, it is determined whether the steering angle is greater than a threshold value. At operation 42, it is determined whether the steering angle velocity is greater than a threshold value. At operation 44, it is determined whether the steering torque is greater than a threshold value. If the answer at any of operations 40, 42, 44 is yes, an auto start command may be initiated at operation 46. If the answer to all of the operations 40, 42, 44 is no, an auto start command may not be initiated at operation 48.

The algorithms disclosed herein may be deliverable to/implemented by one or more processing devices, such as the controllers 24, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), state machines, controllers or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An automotive vehicle comprising:
    an engine; and
    at least one controller configured to (i) receive information about steering angle velocity or steering input torque during an engine auto stop event, (ii) detect an engine auto stop inhibit condition when one of the steering angle velocity or steering input torque exceeds a threshold value, and (iii) inhibit an auto stop of the engine in response to detecting the engine auto stop inhibit condition.

2. The vehicle of claim 1 wherein the at least one controller is further configured to (iv) receive information about whether the engine is stopped, (v) detect an engine auto start condition when the engine is stopped and one of the steering angle velocity or steering input torque exceeds a threshold value, and (vi) initiate an auto start of the engine in response to detecting the engine auto start condition.

3. The vehicle of claim 1 wherein inhibiting an auto stop of the engine includes commanding fuel to resume flowing to the engine.

4. The vehicle of claim 1 wherein inhibiting an auto stop of the engine includes preventing the engine from stopping.

5. The vehicle of claim 2 wherein initiating an auto start of the engine includes commanding a starter to crank the engine.

6. A method for controlling an automotive vehicle engine comprising:
    receiving information about steering angle velocity or steering input torque during an engine auto stop event;
    detecting an engine auto stop inhibit condition when one of the steering angle velocity or steering input torque exceeds a threshold value; and
    inhibiting an auto stop of the engine in response to detecting the engine auto stop inhibit condition.

7. The method of claim 6 wherein inhibiting an auto stop of the engine includes commanding fuel to resume flowing to the engine.

8. The method of claim 6 wherein inhibiting an auto stop of the engine includes preventing the engine from stopping.

9. The method of claim 6 further comprising receiving information about whether the engine is stopped, detecting an engine auto start condition when the engine is stopped and one of the steering angle velocity or steering input torque exceeds a threshold value, and initiating an auto start of the engine in response to detecting the engine auto start condition.

10. The method of claim 9 wherein initiating an auto start of the engine includes commanding a starter to crank the engine.

11. A micro hybrid vehicle comprising:
    an engine; and
    at least one controller configured to determine whether to allow the engine to auto stop based on information about steering input torque or rate of change of steering angle.

12. The vehicle of claim 11 wherein determining whether to allow the engine to auto stop includes determining whether the steering input torque or rate of change of steering angle exceeds a threshold value.

13. The vehicle of claim 11 wherein the at least one controller is further configured to determine whether to command the engine to auto start based on the information about steering input torque or rate of change of steering angle.

14. The vehicle of claim 13 wherein the at least one controller is further configured to command the engine to auto start if the steering input torque or rate of change of steering angle exceeds a threshold value.

15. The vehicle of claim 14 wherein commanding the engine to auto start includes commanding a starter to crank the engine.

\* \* \* \* \*